(12) United States Patent
Yamada

(10) Patent No.: US 9,395,540 B2
(45) Date of Patent: Jul. 19, 2016

(54) HUD FUSION INTERFACE

(71) Applicant: Honda Motor Co., Ltd., Tokyo (JP)

(72) Inventor: Hajime Yamada, Rancho Palos Verdes, CA (US)

(73) Assignee: Honda Motor Co., Ltd., Tokyo (JP)

( * ) Notice: Subject to any disclaimer, the term of this patent is extended or adjusted under 35 U.S.C. 154(b) by 495 days.

(21) Appl. No.: 13/915,067

(22) Filed: Jun. 11, 2013

(65) Prior Publication Data

US 2014/0362448 A1    Dec. 11, 2014

(51) Int. Cl.
*G02B 7/14* (2006.01)
*G02B 27/01* (2006.01)

(52) U.S. Cl.
CPC ................................ *G02B 27/0101* (2013.01)

(58) Field of Classification Search
USPC .......................................... 359/631, 629, 633
See application file for complete search history.

(56) References Cited

U.S. PATENT DOCUMENTS

| 5,140,465 A | 8/1992 | Yasui et al. |
| 2009/0009594 A1 | 1/2009 | Kawai |
| 2010/0188720 A1 | 7/2010 | Nakamura et al. |
| 2012/0188650 A1 | 7/2012 | Rumpf et al. |

*Primary Examiner* — Jack Dinh
(74) *Attorney, Agent, or Firm* — Arent Fox LLP

(57) ABSTRACT

A display device includes a first projector, a second projector, a first half mirror, a second half mirror and a reflection unit. The first projector is positioned with respect to the first half mirror such that the first rays are transmitted through the first half mirror in a given direction. The second projector is positioned with respect to the first half mirror such that the second rays are reflected by the first half mirror in the given direction. The reflection unit reflects the first rays and the second rays from the first half mirror to the second half mirror. The second half mirror reflects the first rays and the second rays from the reflection unit along the line of sight. The reflection unit further includes a reflector-projector that reflects the first rays and the second rays toward the second half mirror and projects third rays toward the second half mirror.

20 Claims, 4 Drawing Sheets

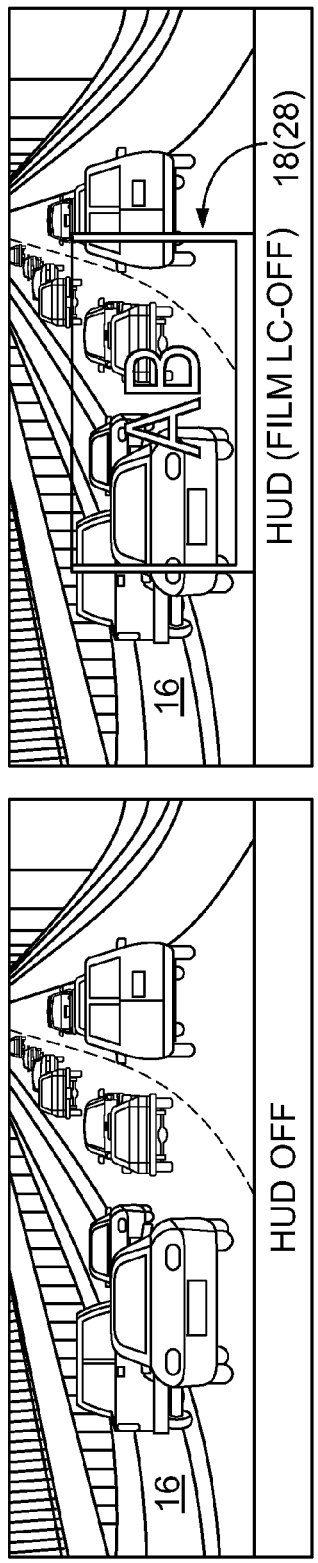
FIG. 3A
FIG. 3B
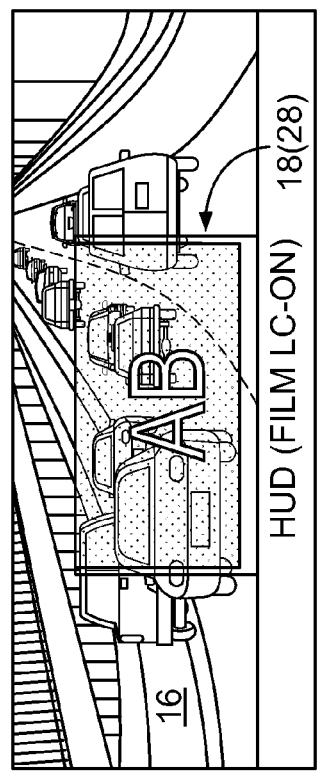
FIG. 3C

HUD FUSION INTERFACE

TECHNICAL FIELD

The present disclosure relates to apparatuses and methods of displaying information and, more particularly, apparatuses and methods of displaying information to an operator of a vehicle.

BACKGROUND

Head-up displays provide information to an operator of a vehicle in a manner that allows them to see the information while maintaining their line of sight in the direction of travel. For example, an automobile can be equipped with a head-up display (HUD) that is provided between a windshield and the driver and is located such that information displayed by the HUD appears in a line of sight of the driver while their eyes can be kept through the windshield on the road ahead. While the presence of a HUD is useful to the operator, it can be helpful to provide adjustability or selectivity of the content being shown on the display depending on the amount of information the operator wishes to obtain.

SUMMARY

In a first example embodiment, a display device includes a first projector, a second projector, a first half mirror, a second half mirror and a reflection unit. The first projector is configured to project first rays forming a first image component. The second projector is configured to project second rays forming a second image component. The first projector is positioned with respect to the first half mirror such that the first rays are transmitted through the first half mirror in a given direction. The second projector is positioned with respect to the first half mirror such that the second rays are reflected by the first half mirror in the given direction. The second half mirror is configured as a screen of the display device and is disposed such that a line of sight of a viewer can extend to and past the second half mirror. The reflection unit is configured to reflect the first rays and the second rays from the first half mirror to the second half mirror. The second half mirror is configured to reflect the first rays and the second rays from the reflection unit along the line of sight such that the first image component and the second image component form an image for a viewer to see. The reflection unit further includes a reflector-projector configured to reflect the first rays and the second rays toward the second half mirror and to project third rays toward the second half mirror. The third rays form a third image component.

In one example aspect of the first example embodiment, a surface area of the reflector-projector includes a first portion that is reflective and a second portion that projects the third rays.

In another example aspect of the first example embodiment, the first half mirror can be pivoted such that the second rays are not incident on the first half mirror and only the first rays are transmitted through the first half mirror.

In yet another example aspect of the first example embodiment, the reflection unit includes a plurality of mirrors.

In yet another example aspect of the first example embodiment, the reflection unit further includes a mirror configured to reflect the first rays and the second rays from the reflector-projector toward the second half mirror.

In yet another example aspect of the first example embodiment, the second half mirror can be pivoted so as to not intersect with the given line of sight.

In yet another example aspect of the first example embodiment, the second half mirror is part of a screen of a head-up display.

In yet another example aspect of the first example embodiment, the second half mirror is provided between a window of a vehicle and a viewer located in the vehicle.

In yet another example aspect of the first example embodiment, the second half mirror is adjustable between a light transparent state and a dark transparent state.

In yet another example aspect of the first example embodiment, the second half mirror includes a liquid crystal cell.

In yet another example aspect of the first example embodiment, the first projector and the second projector are provided inside a dashboard of a vehicle.

In yet another example aspect of the first example embodiment, a light emitting dial is located between the second projector and the first half mirror and operated as an additional projector.

In a second example embodiment, a display device includes a first projector, a second projector, a first half mirror, a reflection unit and a second half mirror. The first projector is configured to project first rays forming a first image component. The second projector is configured to project second rays forming a second image component. The first projector is positioned with respect to the first half mirror such that the first rays are transmitted through the first half mirror in a given direction. The second projector is positioned with respect to the first half mirror such that the second rays are reflected by the first half mirror in the given direction. The reflection unit is configured to reflect the first rays and the second rays from the first half mirror. The second half mirror is configured as a screen of the display device and is disposed such that a line of sight of a viewer can extend to and past the second half mirror. The second half mirror is configured to reflect the first rays and the second rays from the reflection unit along the line of sight such that the first image component and the second image component form an image for a viewer to see. The first half mirror can be pivoted such that the second rays are not incident on the first half mirror and the first rays are transmitted through the first half mirror. The second half mirror can be pivoted so as to not intersect with the given line of sight.

In one example aspect of the second example embodiment, the second half mirror includes a liquid crystal cell.

In another example aspect of the second example embodiment, the second half mirror is adjustable between a light transparent state and a dark transparent state.

In yet another example aspect of the second example embodiment, the second half mirror is provided between a window of a vehicle and a viewer located in the vehicle.

In yet another example aspect of the second example embodiment, the second half mirror is part of a screen of a head-up display.

In yet another example aspect of the second example embodiment, the first projector and the second projector are provided inside a dashboard of a vehicle, and a light emitting dial is located between the second projector and the first half mirror and operate as an additional projector.

In yet another example aspect of the second example embodiment, the reflection unit includes a plurality of mirrors.

In a third example embodiment, a vehicle includes an area from which the vehicle is controlled and a display device adjacent the area. The display device includes a first projector, a second projector, a first half mirror, a second half mirror and a reflection unit. The first projector is configured to project first rays forming a first image component. The second projector is configured to project second rays forming a second image component. The first projector is positioned with respect to the first half mirror such that the first rays are transmitted through the first half mirror in a given direction. The second projector is positioned with respect to the first half mirror such that the second rays are reflected by the first half mirror in the given direction. The second half mirror is configured as a screen of the display device and is disposed such that a first line of sight of a viewer located in the area extends to and past the second half mirror ahead of the vehicle. The reflection unit is configured to reflect the first rays and the second rays from the first half mirror to the second half mirror. The second half mirror is configured to reflect the first rays and the second rays from the reflection unit along the first line of sight such that the first image component and the second image component form an image for a viewer. A second line of sight of a viewer located in the area extends to at least one of the first projector and the second projector.

BRIEF DESCRIPTION OF THE DRAWINGS

These and other aspects are better understood when the following detailed description is read with reference to the accompanying drawings, in which:

FIG. 3A is an example view appearing to the operator in a direction of travel when the display device is turned off in accordance with one or more aspects of the present disclosure;

FIG. 3B is an example view appearing to the operator in a direction of travel when the screen of the display device is in a low reflective state in accordance with one or more aspects of the present disclosure;

FIG. 3C is an example view appearing to the operator in a direction of travel when the screen of the display device is in a high reflective state in accordance with one or more aspects of the present disclosure.

DETAILED DESCRIPTION

Figure 1:
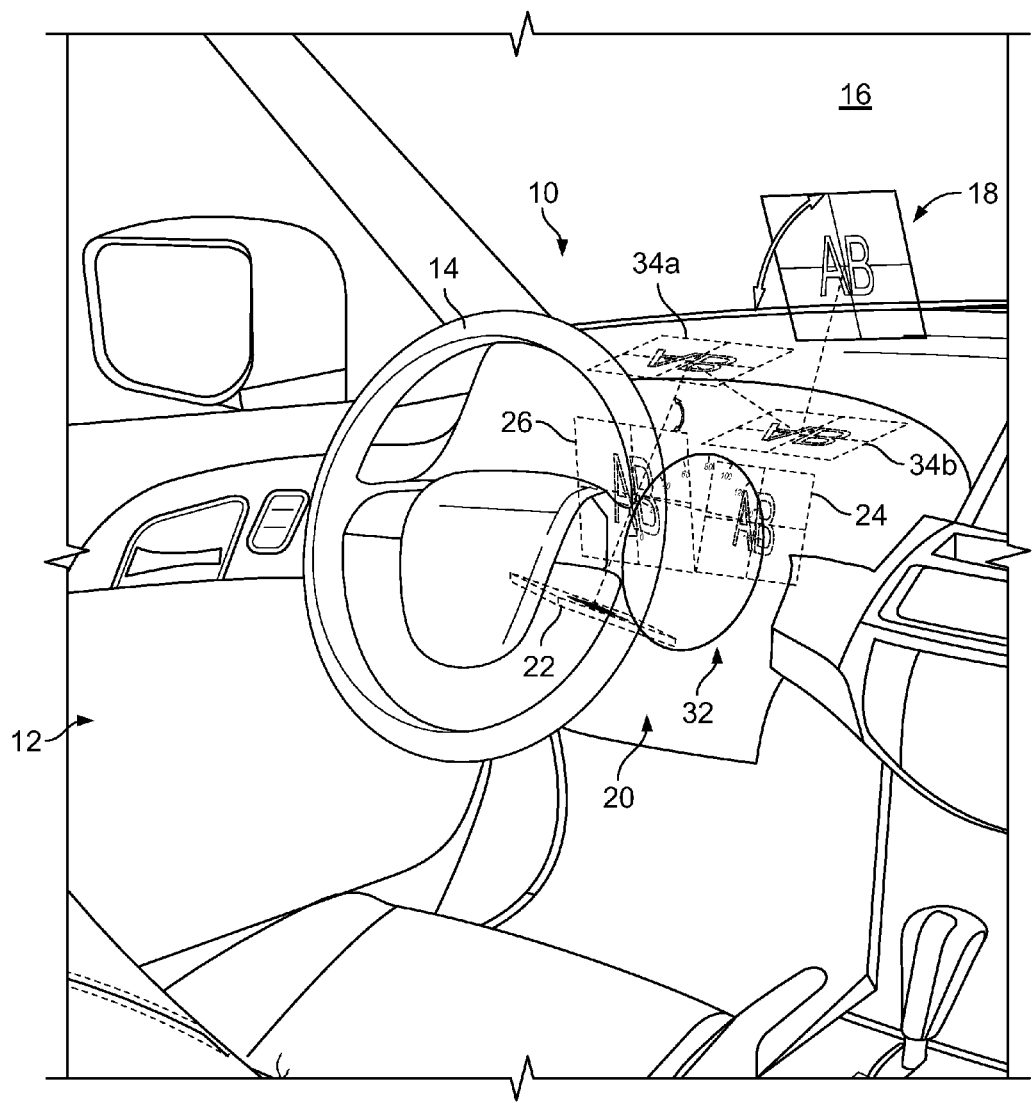
FIG. 1 is a view of an example embodiment of a setting in which an example embodiment of a display device is mounted in accordance with one or more aspects of the present disclosure.

Examples will now be described more fully hereinafter with reference to the accompanying drawings in which example embodiments are shown. Whenever possible, the same reference numerals are used throughout the drawings to refer to the same or like parts. However, aspects can be embodied in many different forms and should not be construed as limited to the embodiments set forth herein.

Referring now to FIG. 1, a schematic view of an example setting in which an example embodiment of a display device 10 discussed herein can be mounted. In this embodiment, the setting for the display device 10 can be an area provided for an operator or viewer inside a vehicle (e.g., a driver or passenger in a passenger compartment 12 of an automobile or a pilot in a cockpit). The vehicle can include an automobile, a bus, a truck, a train, a motorcycle, a ship, a boat, an aircraft or the like. However, the setting in which the display device 10 is mounted can also be inside a stationary structure such as a mobile home, a building or the like.

As shown in FIG. 1, the display device 10 can be installed near an area from which the vehicle is controlled, such as by a seat for a driver or other kinds of operator, and the display device 10 can be adjacent a control apparatus 14 and can be embodied as a head-up display (HUD). For example, the vehicle can include a window (e.g., a windshield 16) that can provide a view in the direction of travel and the display device 10 can include a screen 18 that is located between the windshield 16 and the control apparatus 14. The control apparatus 14 can be a steering wheel as shown in FIG. 1, a control column of an aircraft or the like and can be manipulated to control the movement of the vehicle. The operator or viewer inside the vehicle can be located near the control apparatus 14 and the screen can be viewable from this position. Other than the screen 18, a majority of the components of the display device 10 can be concealed from view and can be located inside a dashboard 20 of the passenger compartment 12.

Figure 2:
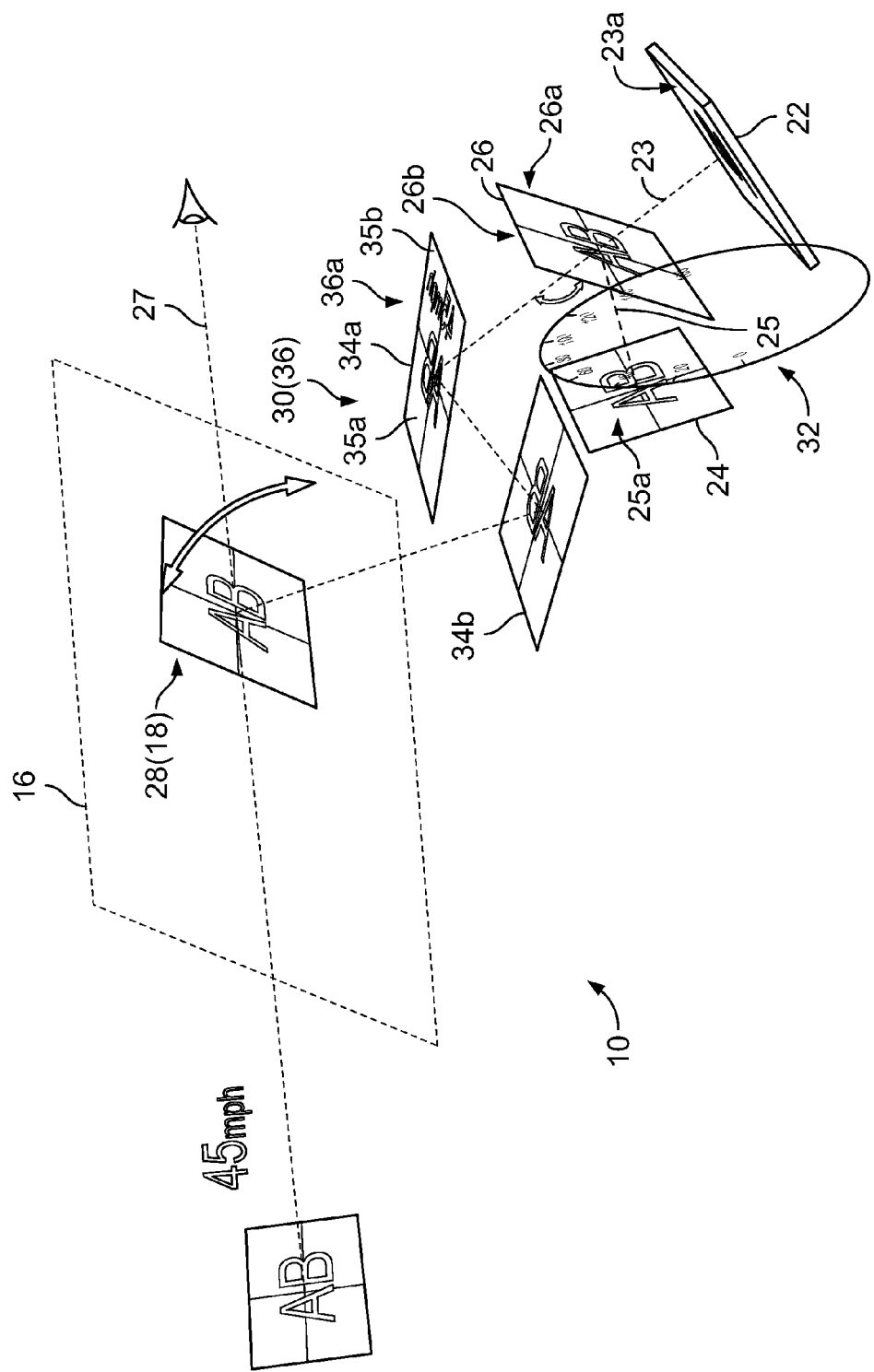
FIG. 2 is a schematic view of components in the display device in accordance with one or more aspects of the present disclosure.

In the example embodiment shown in FIGS. 1-2, the display device 10 includes a first projector 22, a second projector 24, a first half mirror 26, a second half mirror 28, and a reflection unit 30. The first projector 22 and the second projector 24 can be provided inside the dashboard 20 and can be oriented to project light rays toward the first half mirror 26 as shown in phantom in FIGS. 1-2. The first and second projectors 22, 24 can be embodied in a variety of mechanisms that can emit light and project light rays onto a plane such that an image can be formed on the plane. Light rays from the first projector 22 and the second projector 24 can be referred to as first rays 23 and second rays 25 respectively. For example, the first and second projectors 22, 24 can be embodied as an LCD (liquid crystal display), a LED (light emitting element) based display, an OLED (organic light-emitting diode) based display or the like, or any combination thereof. Gauges 32 or instrument dials (FIG. 1) of the dashboard 20 (FIG. 1) can also be configured to emit light and operate as an additional projector such as in a manner similar to the first and second projectors 22, 24. The gauge 32 can be located where the instrument panel is commonly located on the dashboard 20 of a vehicle so that the operator/viewer can observe the gauge 32 by taking their eyes off the windshield 16 and looking down.

In the embodiment of FIGS. 1-2, the second projector 24 can be located behind one or more gauges 32 (e.g., dials) facing a first side 26a of the first half mirror 26 while the first projector 22 is located in front of the first half mirror 26 facing a second side 26b of the first half mirror 26. The first projector 22 can be positioned at an angle with respect to the second side 26b of the first half mirror 26 while the second projector 24 can be positioned at an angle with respect to the first side 26a of the first half mirror 26. Since a half mirror (which can also be known as half-silvered mirror, a beam splitter or a combiner) is configured to reflect some of the light rays incident thereon while allowing the rest of the light rays incident thereon to be transmitted therethrough, some of the light rays emitted from the first projector 22 and incident on the first half mirror 26 are transmitted through the first half mirror 26 while the rest of the light rays emitted from the first projector 22 is reflected by the first half mirror 26. Moreover, some of the light rays emitted from the second projector 24 and incident on the first half mirror 26 are reflected by the first half mirror 26 while the rest of the light rays emitted therefrom the second projector 24 is transmitted through the first half mirror 26. Light rays from the first projector 22 transmitted through the first half mirror 26 in a given direction form a first image component 23a while light rays from the second projector 24 reflected by the first half mirror 26 in the given direction form a second image component 25a. Because the first rays 23 and the second rays 25 are directed in the same direction by the first half mirror 26, the first image component 23a and the second image component 25a can form an image (shown in a simplified manner as "AB" in FIGS. 1-2) that is a combination of the two image components 23a, 25a. The first half mirror 26 can be a 25% reflective and 75% transmissive such that the image is formed by more of the first rays from the first projector 22 (and thus the first image component 23a) than the second rays from the second projector 24 (and thus the second image component 23b). Alternatively, the first half mirror 26 can be pivoted as indicated by the arrow in FIG. 2 such that the second rays 25 are not incident on the first half mirror 26 and only the first rays are incident on the first half mirror 26. A feature (e.g., a switch) to control the pivoting of the first half mirror can be provided on the dashboard 20.

The term "toward" can refer to projection of rays directly onto a plane as well as projection of rays in an indirect manner such as rays that reach a plane after being reflected from one or more mirrors.

The reflection unit 30 is configured to direct the light rays from the first half mirror 26 to the second half mirror 28 and can include one or more mirrors 34. In the embodiment of FIG. 2, the reflection unit 30 includes a first mirror 34a and a second mirror 34b. The first mirror 34a can be located such that light rays from the first projector 22 transmitted through the first half mirror 26 and light rays from the second projector 24 reflected by the first half mirror 26 are incident on the first mirror 34a. Thus, the first and second rays 23, 25 are reflected by the first mirror 34a. Moreover, the first mirror 34a is oriented to reflect the first and second rays 23, 25 from the first half mirror 26 toward the second mirror 34b which is oriented to reflect the first and second rays 23, 25 from the first mirror 34a toward the second half mirror 28.

One of the components in the reflection unit 30 can be configured to operate as a third projector. This component can be configured to function in a dual manner as a mirror and a projector (i.e., a reflector-projector 36). As shown in FIG. 2, the first mirror 34a can be configured as the reflector-projector 36 and the surface area of the first mirror 34a can include a first portion 35a that reflects light rays and a second portion 35b that projects third rays forming a third image component 36a. For example, the first and second rays 23, 25 combine to form an image as discussed above while the third rays form a third image component 36a an example of which is shown as "45 mph" in FIG. 2. The third image component 36a is omitted in FIG. 2 from some of the components of the display device 10 for clarity of illustration even though the third image component 36a can be reflected by or transmitted through the component of the display device 10. The first portion 35a can reflect the first and second rays 23, 25 from the first half mirror 26 toward the second mirror 34b while the second portion 35b can project the third rays forming the "45 mph" onto the second mirror 34b so as to be reflected by the second mirror. In one embodiment, the reflector-projector 36 can include a half mirror and the third projector where the third projector is located behind the half mirror and project the third rays toward the second mirror. Alternatively, half of a surface area of the reflector-projector 36 can be a mirror while the other half of the reflector-projector is a half mirror with the third projector located behind the half mirror.

The second half mirror 28 can be configured to be part of the screen 18 of the HUD that the operator/viewer looks at as shown in FIG. 2. The second half mirror 28 can be 50% reflective and 50% transmissive. The second half mirror 28 can be pivoted so as to be concealed from view when the HUD is turned off (FIG. 3A) or to intersect with the line of sight 27 of the operator/viewer when the HUD is turned on, as indicated by the arrow in FIG. 2. The dashboard 20 can include a feature (e.g., a switch) to control the pivoting of the second half mirror 28. The second half mirror 28 can be configured to reflect the first rays 23 and the second rays 25 toward the eyes of the operator of the vehicle so that the operator/viewer sees the image formed by the first image component 23a and the second image component 25a. Thus, the second half mirror 28 is located in the line of sight 27 of the operator/viewer which can extend to and past the second half mirror 28 ahead of the vehicle in this embodiment. Moreover, the second half mirror 28 can be sized to cover only a portion of the entire windshield 16, such as the bottom portion of the windshield in front of the driver, as shown in FIGS. 3B and 3C. Therefore, the operator/viewer can be able to look ahead of the vehicle in part through the second half mirror 28 and in part through the windshield 16 as shown in FIGS. 3B and 3C.

FIG. 3A shows the HUD in a turned off state in which the screen 18 (i.e., the second half mirror 28) is pivoted out of view and does not intersect with the line of sight 27 extending through the windshield 16. The screen 18 can be concealed inside the dashboard 20 in an off state. However, the second projector 24 and the gauges 32 can be located on the instrument panel of the dashboard so as to be viewable by the operator/viewer even when the HUD is turned off. Moreover, in the off state of the HUD, the content of the first projector 22 can be viewable by looking at the instrument panel of the dashboard 20 through reflection by the first half mirror 26. FIGS. 3B and 3C show the HUD in a turned on state in which the screen 18 is pivoted to appear in front of the operator/viewer and to intersect with the line of sight 27 extending through the windshield 16. The screen 18 can be configured to provide at least some degree of transparency during all states in which the HUD is turned on so that the view of the operator/viewer through the windshield 16 is not hampered when the HUD is turned on. It can be possible to embody such a screen 18 using a liquid crystal film that can reflect the rays 23, 25 from the projectors 22, 24 toward the viewer's eyes to display the image components while at the same time providing transparency. Moreover, it can be possible to control the brightness of the screen 18 and switch between a light transparent state (FIG. 3B) and a dark transparent state (FIG. 3C) by activating a liquid crystal cell of such a second half mirror 28.

Figure 4:
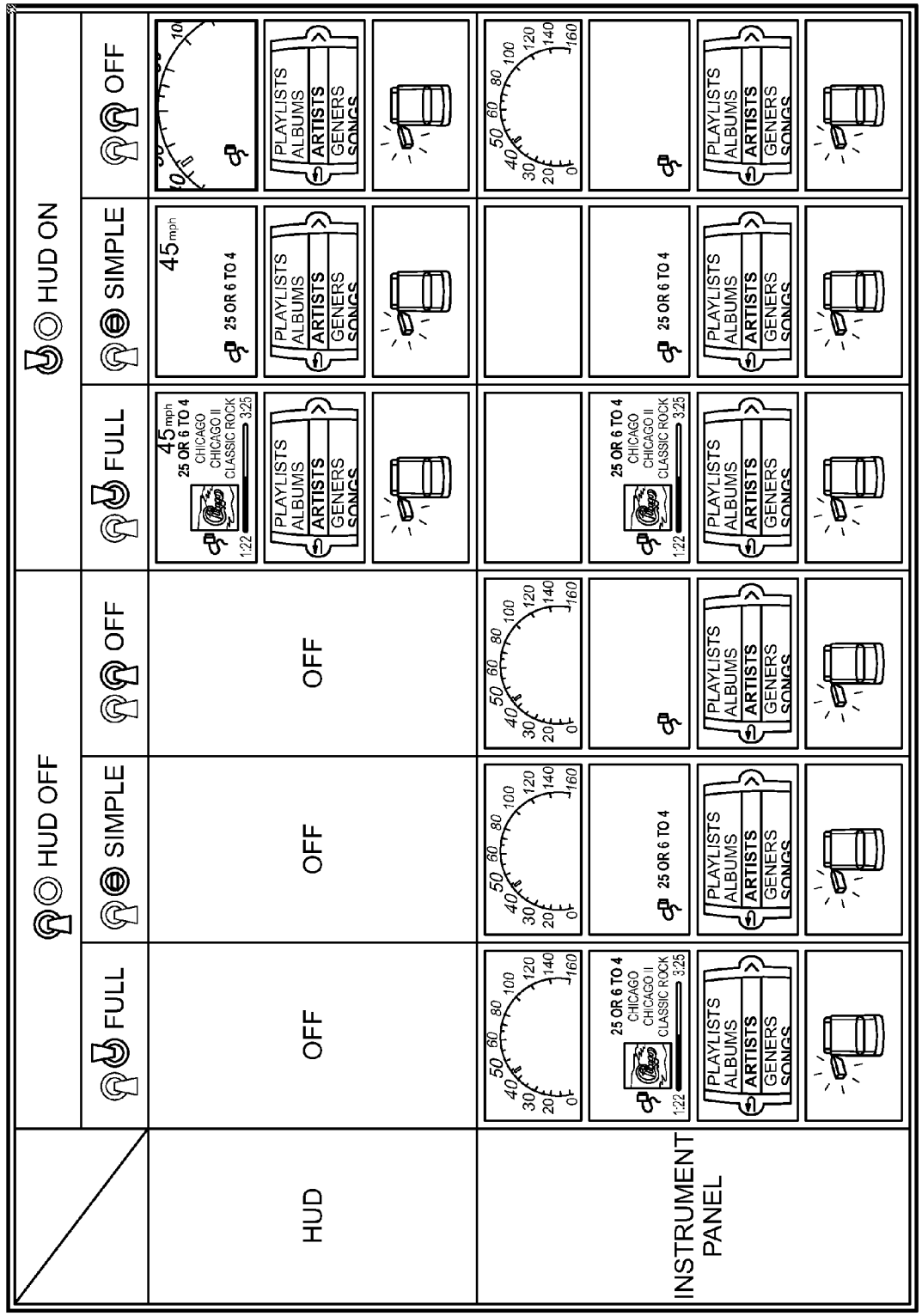
FIG. 4 is an example chart showing a variety of content arrangements appearing on a screen of the display device depending on modes of the display device set by an operator in accordance with one or more aspects of the present disclosure.

FIG. 4 provides a chart showing examples of various contents (e.g., figures or representations) that can appear on an instrument panel of the dashboard 20 next to the gauges 32 and the screen 18 of the HUD. The bottom four rows in the chart illustrate what can appear on the instrument panel while the top three rows in the chart illustrate what can appear on the screen 18. A control panel can be provided as shown at the top two rows of the chart that allow for manipulation by the operator/viewer. The control panel can allow the HUD to be turned on or off and can allow for the level of detail of the figures or representations to vary between full (more detailed), simple and off (least detailed). Each column of the chart illustrates the possible figures or representations that can be shown on the screen 18 of the HUD or the instrument panel in one of the full, simple or off states. The figures or representations appearing on the instrument panel can be the same regardless of whether or not the HUD is on. Alternatively, some of the information provided on the instrument panel can instead be provided on the HUD. For example, when the HUD is on, the speedometer dial disappear from the instrument panel either in the full or simple state and the speed can instead appear on the screen 18 of the HUD as a numerical indication. Moreover, the figures or representations appearing on the screen 18 of the HUD can be redundant of what appears on the instrument panel of the dashboard 20. However, the screen 18 of the HUD is still helpful in that the operator/viewer can obtain such information without looking down at instrument panel of the dashboard 20.

Each of the first projector 22, the second projector 24 and the third projector can be configured to emit rays forming an image component corresponding to a specific type of information shown on the instrument panel or the screen 18. For example, the first image component 23a can correspond to information relating to an entertainment system of the vehicle (e.g., second and third rows from bottom in FIG. 4), the second image component 25a can correspond to information relating to settings of the vehicle (e.g., door open; bottom row in FIG. 4) and the third image component 36a can correspond to information relating to operating conditions of the vehicle (e.g., speed; fourth row from bottom in FIG. 4).

Moreover, the first image component 23a formed by the first projector 22 can be the figures or representations appearing on the screen 18 of the HUD and the second image component 25a formed by the second projector 24 can be the figures or representations appearing on the instrument panel. Alternatively, some of the figures or representations viewed by the operator/viewer on the screen 18 of the HUD can be formed by the first image component 23a of the first projector 22 while the rest of the figures or representations viewed by the operator/viewer on the screen of the HUD can be formed by the second image component 25a of the second projector 24. The third image component 36a formed by the third projector can be a numerical indication of speed. Furthermore, the speedometer dial on the instrument panel cannot need to be lit when the third projector is emitting the numeral indication of speed onto the second half mirror 28 of the screen 18.

The aforementioned display device 10 can operate or be operated in the following manner. When the display device 10 or HUD is turned off, the operator/viewer inside the vehicle can observe what is ahead of the vehicle (e.g., traffic) through the windshield 16 as shown in FIG. 3A and can obtain information by looking at the instrument panel of the dashboard 20. Examples of figures or representations that are viewable on the instrument panels are shown on the three columns on the left in FIG. 4. The amount of information provided by the instrument panel can vary depending on any of full, simple or off states which can be selected by the operator/viewer from the dashboard 20. Thereafter, the operator/viewer can turn on the display device 10 or HUD using controls provided on the dashboard 20. Once the HUD is turned on, the screen 18 is pivoted to be in a substantially upright position thereby allowing the operator/viewer to obtain additional information through the screen 18 without significantly diverting their line of sight from what is ahead. However, the same information can still appear on the instrument panel as on the HUD as shown in FIG. 4. Thus, when the HUD is turned on, the line of sight of viewer can be directed either to the instrument panel (e.g., the second projector 24 or the gauge 32) when looking up at the windshield 16 or the screen 18 of the HUD (i.e., the second half mirror 28) when looking down at the instrument panel. The brightness of the screen 18 can be adjusted and information on the screen 18 can be easier to perceive when the screen 18 is in a dark transparent state although information can still be perceivable in a light transparent state of the screen 18 as shown in FIGS. 3B-3C.

The figures or representations on the instrument panel and the HUD can be formed by a combination of components that can include the projectors 22, 24, the reflector-projector 36 and the gauge 32. Each of these components can provide different type of information to the operator/viewer. For example, the first image component 23a of the first projector 22 can relate only to an entertainment system while the second image component 25a of the second projector 24 can relate only to the settings of the vehicle. Moreover, the components of the display device 10 can be appropriately controlled so as to provide easily discernible information on the screen 18. A processor can be provided to appropriately turn on or off one or more of these components depending on the content that need to be shown on the screen 18. Furthermore, the first half mirror 26 can be pivoted so that the second image component 25a and the gauge 32 cannot be shown on the screen 18 and the content shown on the screen 26 is restricted to the first image component 23a and the third image component 36a.

It will be apparent to those skilled in the art that various modifications and variations can be made without departing from the spirit and scope of the claimed invention.

What is claimed is:

1. A display device including:
a first projector configured to project first rays forming a first image component;
a second projector configured to project second rays forming a second image component;
a first half mirror, the first projector positioned with respect to the first half mirror such that the first rays are transmitted through the first half mirror in a given direction, the second projector positioned with respect to the first half mirror such that the second rays are reflected by the first half mirror in the given direction;
a second half mirror configured as a screen of the display device and disposed such that a line of sight of a viewer extends to and past the second half mirror; and
a reflection unit configured to reflect the first rays and the second rays from the first half mirror to the second half mirror, the second half mirror configured to reflect the first rays and the second rays from the reflection unit along the line of sight such that the first image component and the second image component form an image for a viewer, the reflection unit further including a reflector-projector configured to reflect the first rays and the second rays toward the second half mirror and to project third rays toward the second half mirror, the third rays forming a third image component.

2. The device of claim 1, wherein a surface area of the reflector-projector includes a first portion that is reflective and a second portion that projects the third rays.

3. The device of claim 1, wherein the first half mirror is pivoted such that the second rays are not incident on the first half mirror and only the first rays are transmitted through the first half mirror.

4. The device of claim 1, wherein the reflection unit includes a plurality of mirrors.

5. The device of claim 4, the reflection unit including a mirror configured to reflect the first rays and the second rays from the reflector-projector toward the second half mirror.

6. The device of claim 1, wherein the second half mirror is pivoted so as to not intersect with the line of sight.

7. The device of claim 6, wherein the second half mirror is part of a screen of a head-up display.

8. The device of claim 6, wherein the second half mirror is provided between a window of a vehicle and a viewer located in the vehicle.

9. The device of claim 1, wherein the second half mirror is adjustable between a light transparent state and a dark transparent state.

10. The device of claim 9, wherein the second half mirror includes a liquid crystal cell.

11. The device of claim 1, wherein the first projector and the second projector are provided inside a dashboard of a vehicle.

12. The device of claim 11, wherein a light emitting dial is located between the second projector and the first half mirror and operated as an additional projector.

13. A display device including:
a first projector configured to project first rays forming a first image component;
a second projector configured to project second rays forming a second image component;
a first half mirror, the first projector positioned with respect to the first half mirror such that the first rays are transmitted through the first half mirror in a given direction, the second projector positioned with respect to the first half mirror such that the second rays are reflected by the first half mirror in the given direction;
a reflection unit configured to reflect the first rays and the second rays from the first half mirror; and
a second half mirror configured as a screen of the display device and disposed such that a line of sight of a viewer extends to and past the second half mirror, the second half mirror configured to reflect the first rays and the second rays from the reflection unit along the line of sight such that the first image component and the second image component form an image for a viewer to see,
wherein the first half mirror is pivoted such that the second rays are not incident on the first half mirror and the first rays are transmitted through the first half mirror, and the second half mirror is pivoted so as to not intersect with the given line of sight.

14. The device of claim 13, wherein the second half mirror includes a liquid crystal cell.

15. The device of claim 13, wherein the second half mirror is adjustable between a light transparent state and a dark transparent state.

16. The device of claim 15, wherein the second half mirror is provided between a window of a vehicle and a viewer located in the vehicle.

17. The device of claim 13, wherein the second half mirror is part of a screen of a head-up display.

18. The device of claim 13, wherein the first projector and the second projector are provided inside a dashboard of a vehicle, and a light emitting dial is located between the second projector and the first half mirror and operate as an additional projector.

19. The device of claim 13, wherein the reflection unit includes a plurality of mirrors.

20. A vehicle including an area from which the vehicle is controlled and a display device adjacent the area, the display device including:
a first projector configured to project first rays forming a first image component;
a second projector configured to project second rays forming a second image component;
a first half mirror, the first projector positioned with respect to the first half mirror such that the first rays are transmitted through the first half mirror in a given direction, the second projector positioned with respect to the first half mirror such that the second rays are reflected by the first half mirror in the given direction;
a second half mirror configured as a screen of the display device and disposed such that a first line of sight of a viewer located in the area extends to and past the second half mirror ahead of the vehicle; and
a reflection unit configured to reflect the first rays and the second rays from the first half mirror to the second half mirror, the second half mirror configured to reflect the first rays and the second rays from the reflection unit along the first line of sight such that the first image component and the second image component form an image for a viewer,
wherein a second line of sight of a viewer located in the area extends to at least one of the first projector and the second projector.

* * * * *